Nov. 4, 1947.                M. KATCHER                 2,430,426
            SHAFT SEAL AND PRESSURE PLATES AND A SPRING THEREFOR
                          Filed Sept. 27, 1943

INVENTOR
*Morris Katcher*
BY
*Emanuel Schuyer*
ATTORNEY

Patented Nov. 4, 1947

2,430,426

UNITED STATES PATENT OFFICE 2,430,426

SHAFT SEAL AND PRESSURE PLATES AND A SPRING THEREFOR

Morris Katcher, New York, N. Y.

Application September 27, 1943, Serial No. 503,942

4 Claims. (Cl. 286—7)

1

This invention relates to seals, particularly to the holding means for maintaining the seals in position, such seals as are used in the water pump of an internal combustion engine. The seal as applied to a rotary shaft is adapted to eliminate or minimize leakage from the fluid chamber to the bearing of the drive shaft.

The particular ring or gasket of rubber or the like used in connection with the present invention forms the subject of my Patent No. 2,288,164. This ring is caused to bind on the shaft yet has a portion extending directly radially out from it which can be freely moved axially into sealing relation with a sealing washer, pressing the latter against the bearing or its mounting. As applied to a water pump, the binding of the rubber gasket on the shaft will not interfere with the pushing of the sealing washer against the end of the bearing or its mounting, the latter usually being the hub of the pump housing.

In the construction of aforementioned patent difficulty has been had in the assembling of the annular plates and their individual springs used to press against the rubber ring.

In accordance with the present invention, the annular plates are joined by a flexible web, such as spokes and the spring is made of one piece although it has two parts acting substantially independently of each other to press against the plates. Each plate acts substantially independently of the other in pressing against the rubber ring. It is thus seen that only two separated parts are required in the present invention, whereas the construction disclosed in the patent requires four separated parts in place of said two.

Other objects and advantages will became apparent upon further study of the description and drawing, in which.

Figure 1:
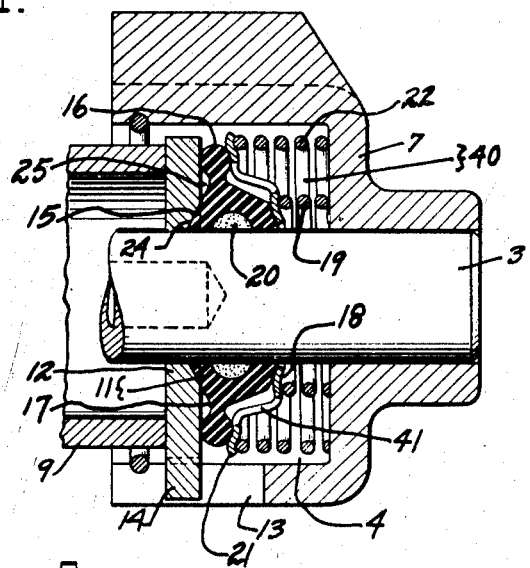
Fig. 1 is a central longitudinal section through the seal and the impeller of an automobile water pump, a fragment only of the shaft and of the journal or hub of the pump housing being shown, the shaft bearing being omitted from the housing. It is shown in my aforementioned patent.

Shaft 3 which is mounted and driven as shown in Fig. 1 of my aforementioned patent has the impeller 7 of the water pump fixed to it. A ring 11 of rubber or the like is mounted on shaft

2

3. Between ring 11 and the inner end of hub 9 of the water pump housing, a washer 12 is slidably mounted on the shaft. It is desired to prevent the water surrounding impeller 7, which includes water in the space 4, from escaping past washer 12 into the interior of hub 9 where is located (not shown) the bearing for shaft 3.

Washer 12 is splined to impeller 7, one or more slots, as at 13, being provided in the impeller for receiving corresponding tongues of the washer as at 14. Washer 12 is of carbon, or of a phenol condensation product or of other materials which are well known to the art for washers used in the present instance.

Ring 11 is substantially T-shaped in cross section. The main portion or head 15 of ring 11 is U-shaped in cross section with the legs of the U extending radially inward. Portion 15 extends in a general axial direction. Extending radially directly outward from main or head portion 15 is a flange or stem which in cross section has a bulb-like outer portion 16 connected by a necked-down portion 17 to the main portion 15. Ring 11 has a snug fit on shaft 3 but without binding thereon. Inner annular bearing plate 18 is adapted to engage the inner end of portion 15 of ring 11. Plate 18 is urged against portion 15 by one end of inner coil 19 of double coil spring 40, the other end of said coil bearing against impeller 7. Plate 18 forces portion 15 downwardly against shaft 3 and forwardly against washer or sealing ring 12 for maintaining it in sealing relation with the washer and the washer in turn in sealing relation with the inner end of hub 9. It will be noted that plate 18 engages portion 15 at an angle so as to force it in both directions to maintain a seal between both shaft 3 and sealing washer 12. However, the binding of the inner end of portion 15 on shaft 3 interferes to a certain extent with its efficiency, in bearing at its forward end against sealing washer 12, leaving the bearing at its forward end, that is adjacent washer 12, to take place largely, except as will be explained, through the yielding of the rubber of which portion 15 is formed. Sealing washer 12 is provided with a beveled recess 24 adjacent shaft 3, the forward end of portion 15 having a complementary bevel to fit therein, so that whatever axial pressure is transmitted to said forward end will also cause a binding of said end on the shaft, in addition to a pressure seal with washer 12. Portion 15 is hollowed out or internally annularly grooved between its inner and forward ends to leave a space 20 which is filled with water grease. The pressure on shaft 3 of the inner and forward ends or legs of portion 15 together with the water grease in space 20 acts to keep water from the pump from traveling along the shaft and reaching the bearing (not shown) inside of hub 9. The water grease will tend to permit portion 15 to slip along the shaft to allow the axial pressure from plate 18 to be transmitted directly to washer 12. Because of the annular groove or space 20, each part or leg of portion 15 can be wedged against the shaft to a certain extent independently of the other. The flexing of said legs due to the axial pressure of coil 19 causes them to grip shaft 3. Any binding on shaft 3 of the inner end or leg of portion 15 interferes with the pressure of ring 11 against sealing washer 12. The same holds true for the forward end or leg of portion 15. As it is desired to get a tight seal between ring 11 and sealing washer 12 and between washer 12 and the inner end of hub 9, without interference from the binding noted above, the flange having bulb portion 16 and necked down portion 17 is provided, said flange bearing axially only against washer 12. An annular bearing plate 21 engages the inner face of bulb portion 16. Outer coil 22 of spring 40, which extends between plate 21 and impeller 7, forces portion 16 axially against sealing washer 12 and the latter in turn against the end of hub 9. This prevents water from passing from the pump between the end of hub 9 and sealing washer 12 and between bulb portion 16 and washer 12.

Space 25 between bulb portion 16 and radially inner portion 15 can also be filled with water grease to assist in the sealing action between ring 11 and sealing washer 12.

Figure 2:
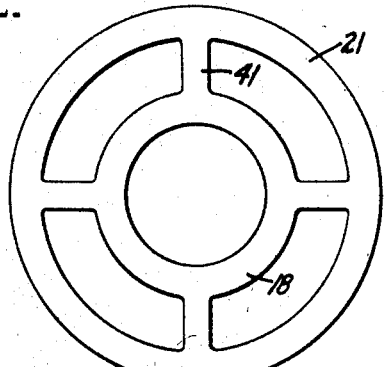
Fig. 2 is a plan view of the sheet metal stamping of the plate assembly before being bent into the final form shown in Fig. 1.
Figure 3:
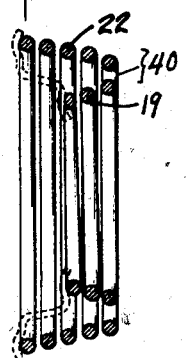
Fig. 3 is a section through the one piece spring having two branches or coils and Fig. 4 is an end view looking at the small or joined end of the spring.
Figure 4:
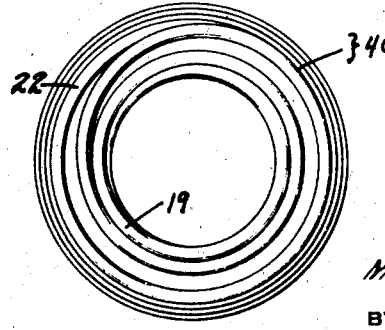

Annular plate 18 is joined to annular plate 21 by flexible webbing, in the particular embodiment shown, said webbing being in the form of spokes 41. The webbing between the plates could be of several types so long as relative axial motion between them is permitted when acted upon by independently acting coils 19 and 22. In my preferred form, the two plates with their connecting web are stamped out from sheet metal, Fig. 2, in the form of a single stamping, being bent as shown in Fig. 1. Other forms of openings between the plates to weaken the web can be used instead of those shown. The plates with their web could be moulded from a plastic, and the web portion, whether spoked or not, could be thinner than the plate portions for increased flexibility.

Sealing washer 12 has been described as bearing against the inner end of housing 9 for producing a seal to prevent the water from entering bearing 8 shown in Fig. 1 of Patent No. 2,288,164, but the same effect can be produced by having the washer bear against the outer race ring of bearing 8. Actually said race ring can be considered as part of the housing itself. In Fig. 1 of said patent, the washer is shown as bearing against both the housing and said race ring. In Fig. 1 of U. S. Patent No. 2,027,505, the washer is shown contacting a specially projecting collar on the bearing. The thought expressed in the claims of bearing against the housing is intended to be broad enough to cover bearing against the bearing instead, or bearing against both the housing and the outer race of the bearing.

The term "rubber" as used in the claims is intended to be broad enough to cover other similar materials such as synthetic rubber.

I claim:

1. For use in a fluid seal with a rubber ring having a radially inner portion and a radially outer portion at a substantial distance from the inner portion, said portions requiring pressure against them to effect the seal, a disk for pressing against said portions comprising an inner and an outer ring connected by a web portion flexible enough to permit the outer ring to exert pressure against said outer portion substantially independently of the exertion of pressure by the inner ring against said inner portion.

2. For use in a fluid seal with a rubber ring having a radially inner portion and a radially outer portion at a substantial distance from the inner portion, said portions requiring pressure against them to effect the seal, a disk for pressing against said portions comprising annular plate parts, one being of larger diameter than the other, and very substantially flexible spokes joining the plate parts, permitting the larger diameter part to exert pressure against said outer portion substantially independently of the exertion of pressure by the smaller diameter part against said inner portion.

3. For use in a fluid seal with a rubber ring having a radially inner portion and a radially outer portion at a substantial radial distance from the inner portion and offset a relatively large distance axially from the latter, said portions requiring pressure against them to effect the seal, a disk for pressing against said portions comprising annular plate parts, one being of larger diameter than the other and offset axially to conform to the offset of the ring portions, and a web part connecting the plate parts, said web part being flexible enough to permit the larger diameter part to exert pressure against said outer portion substantially independently of the exertion of pressure by the smaller diameter part against said inner portion.

4. For use in a fluid seal with a rubber ring having a radially inner portion and a radially outer portion at a substantial radial distance from the inner portion and offset a relatively large distance axially from the latter, said portions requiring pressure against them to effect the seal, a disk for pressing against said portions comprising annular plate parts, one being of larger diameter than the other and offset axially to conform to the offset of the ring portions, said plate parts having substantially the same general inclination to the axial direction, said inclination being less than 90 degrees and a web part connecting the plate parts, said web part being flexible enough to permit the larger diameter part to exert pressure against said outer portion substantially independently of the exertion of pressure by the smaller diameter part against said inner portion.

MORRIS KATCHER.

REFERENCES CITED

The following references are of record in the file of this patent:

UNITED STATES PATENTS

| Number | Name | Date |
| --- | --- | --- |
| 2,288,164 | Katcher | June 30, 1942 |
| 1,779,573 | Volckhausen | Oct. 28, 1930 |
| D. 21,194 | Chisholm | Dec. 1, 1891 |

FOREIGN PATENTS

| Number | Country | Date |
| --- | --- | --- |
| 349,244 | Italy | 1937 |